United States Patent
Hsiao et al.

(10) Patent No.: US 12,197,926 B2
(45) Date of Patent: Jan. 14, 2025

(54) DYNAMIC LOADING NEURAL NETWORK INFERENCE AT DRAM/ON-BUS SRAM/SERIAL FLASH FOR POWER OPTIMIZATION

(71) Applicant: MEDIATEK INC., Hsinchu (TW)

(72) Inventors: Chih-Hsiang Hsiao, Hsinchu (TW); Chia-Feng Hsu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 1057 days.

(21) Appl. No.: 17/097,501

(22) Filed: Nov. 13, 2020

(65) Prior Publication Data

US 2022/0004399 A1    Jan. 6, 2022

Related U.S. Application Data

(60) Provisional application No. 63/047,939, filed on Jul. 3, 2020.

(51) Int. Cl.
*G06F 9/445* (2018.01)
*G06F 1/3234* (2019.01)
(Continued)

(52) U.S. Cl.
CPC ........ *G06F 9/44521* (2013.01); *G06F 1/3275* (2013.01); *G06F 13/28* (2013.01); *G06N 20/00* (2019.01)

(58) Field of Classification Search
CPC .... G06F 9/44521; G06F 1/3275; G06F 13/28; G06N 20/00; G06N 3/045; G06N 3/063; Y02D 10/00
(Continued)

(56) References Cited

U.S. PATENT DOCUMENTS 11,615,322 B1 *   3/2023   Thomas ............... G06F 12/0238
                                                            717/145
2018/0300601 A1 *  10/2018  Cedola .................... G06F 1/324
(Continued)

FOREIGN PATENT DOCUMENTS

CN          108475235 A         8/2018
CN          109389214 A         2/2019
(Continued)

OTHER PUBLICATIONS

Combined Taiwanese Office Action and Search Report issued Jul. 7, 2022, in corresponding Taiwanese Patent Application No. 110118831 (with English Translation of Category of Cited Documents), 8 pages.
(Continued)

*Primary Examiner* — Gautam Sain
*Assistant Examiner* — Wei Ma
(74) *Attorney, Agent, or Firm* — Winston Hsu

(57) ABSTRACT

Aspects of the disclosure provide a method and an apparatus for executing a program, e.g., a neural network (NN) inference. For example, the apparatus can include an executor and a dynamic loading agent. The executor can be coupled to a second memory, and be configured to execute a portion of the NN inference loaded on the second memory from a first memory that stores the NN inference, and to generate a signal based on a progress of the execution of the NN inference. The dynamic loading agent can be coupled to the executor, the first memory and the second memory, and be configured to load a next portion of the NN inference stored in the first memory to the second memory and to manage power supplied to the first memory based on the signal from the executor and an inference executing scheme stored in the second memory.

22 Claims, 9 Drawing Sheets

(51) Int. Cl.
  *G06F 13/28* (2006.01)
  *G06N 20/00* (2019.01)
(58) Field of Classification Search
  USPC .......................................................... 711/105
  See application file for complete search history.

(56) References Cited

U.S. PATENT DOCUMENTS

| | | | | |
|---|---|---|---|---|
| 2019/0147332 | A1* | 5/2019 | Lagudu | G06N 3/045 |
| | | | | 706/25 |
| 2019/0370632 | A1 | 12/2019 | Hashemi et al. | |
| 2020/0257627 | A1* | 8/2020 | Chamarty | G06F 12/0811 |
| 2021/0019652 | A1* | 1/2021 | Gadelrab | G06F 11/3409 |
| 2022/0004399 | A1 | 1/2022 | Hsiao et al. | |

FOREIGN PATENT DOCUMENTS

| | | |
|---|---|---|
| CN | 109919312 A | 6/2019 |
| TW | 201225087 A | 6/2012 |
| TW | 201835918 A | 10/2018 |
| TW | 202004497 A | 1/2020 |
| TW | 110998486 A | 4/2020 |
| TW | 202203036 A | 1/2022 |

OTHER PUBLICATIONS

Extended European Search Report issued Nov. 12, 2021 in European Patent Application No. 21183203.5, 14 pages.

Thierry Moreau, et al., "VTA: An Open Hardware-Software Stack for Deep Learning" Cornell University Library, XP81115846, Jul. 11, 2018, pp. 1-19.

Lita Yang, et al., "SRAM Voltage Scaling for Energy-Efficient Convolutional Neural Networks" 18$^{th}$ International Symposium on Quality Electronic Design (ISQED), IEEE, XP33091586, Mar. 14, 2017, 6 Pages.

Udit Gupta, et al., "MASR: A Modular Accelerator for Sparse RNNs" 28$^{th}$ International Conference on Parallel Architectures and Compilation Techniques (PACT), IEEE, XP33649020, Sep. 23, 2019, pp. 1-14.

Combined Taiwanese Office Action and Search Report issued Mar. 8, 2022 in Taiwanese Patent Application No. 110118831 (with English translation of categories of cited documents), 9 pages.

European Office Action issued on Mar. 30, 2023 in European Patent Application No. 21183203.5, 8 pages.

Koppula Skanda et al: "EDEN Enabling Energy-Efficient, High-Performance Deep Neural Network Inference Using Approximate DRAM", Proceedings of the 52nd Annual IEEE/ACM International Symposium on Microarchitecture, Micro '52, ACM Press, New York, New York, USA, Oct. 12, 2019 (Oct. 12, 2019), pp. 166-181, XP058476973, DOI: 10.1145/3352460.3358280 ISBN: 978-1-4503-6938-1.

Thierry Moreau et al., "VTA: An Open Hardware-Software Stack for Deep Learning", ARXIV, Jul. 11, 2018, pp. 1-19. ,Jul. 11, 2018.

Yang, Lita et al., "SRAM Voltage Scaling for Energy-Efficient Convolutional Neural Networks", Proceedings of the Eighteenth International Symposium On Quality Electronic Design (ISQED), 2017 IEEE, pp. 7-12. ,2017.

* cited by examiner

DYNAMIC LOADING NEURAL NETWORK INFERENCE AT DRAM/ON-BUS SRAM/SERIAL FLASH FOR POWER OPTIMIZATION

INCORPORATION BY REFERENCE

This present disclosure claims the benefit of U.S. Provisional Application No. 63/047,939, "Dynamic loading NN inference at DRAM/ON-bus SRAM/Serial Flash for power optimization," filed on Jul. 3, 2020, which is incorporated herein by reference in its entirety.

TECHNICAL FIELD

The present disclosure relates to memories, and, more particularly, to an apparatus and a method that can dynamically load a neural network inference stored in a memory and manage power supplied to the memory.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Neural networks (NNs) can learn from various examples of a certain task during a process called training. After learning, the task can be performed on new data during a process called inference. An NN inference can have a huge amount of weights and activations and have to be stored in a sufficiently large memory, such as a dynamic random access memory (DRAM). During the execution of the entire NN inference, the DRAM, when powered on, will consume power.

SUMMARY

Aspects of the disclosure provide an apparatus for executing a program. The apparatus can include an executor and a dynamic loading agent. The executor can be coupled to a second memory, and configured to execute a portion of the program loaded on the second memory from a first memory that is configured to store the program, and to generate a signal based on a progress of the execution of the program. The dynamic loading agent can be coupled to the executor, the first memory and the second memory, and configured to load a next portion of the program stored in the first memory to the second memory and to manage power supplied to the first memory based on the signal from the executor and an executing scheme stored in the second memory.

For example, the dynamic loading agent can manage the power supplied to the first memory by powering on/off the first memory, configuring an operation mode of the first memory, or scaling a voltage and/or a frequency applied to the first memory. As another example, the executing scheme can include a script, a rule, or a model. For example, the rule can generate a script for a certain layer of the program based on input tensors from a previous layer of the program. As yet another example, the signal can include an operation, a node identification (ID), a tensor, a kernel, and/or time of the program.

In an embodiment, the second memory can be a tightly-coupled memory (TCM) or a static random access memory (SRAM). In another embodiment, the first memory can be a dynamic random access memory (DRAM), an on-bus SRAM, or a serial flash memory. For example, the executor can be a central processing unit (CPU), and the dynamic loading agent can be a microcontroller unit (MCU). For another example, the executor can be a CPU, and the dynamic loading agent can be CPU exception. For yet another example, the executor can be a deep learning accelerator (DLA), and the dynamic loading agent can be an MCU.

In an embodiment, the dynamic loading agent and the executor can be included on a single chip. In another embodiment, the apparatus can further include a direct memory access (DMA) controller coupled to the dynamic loading agent, the first memory, and the second memory, and the dynamic loading agent can be further configured to instruct the DMA controller to load the next portion of the program stored in the first memory to the second memory.

Aspects of the disclosure also provide a method for executing a program. The method can include loading a portion of the program from a first memory that stores the program to a second memory. The method can further include executing the portion of the program loaded on the second memory, and generating a signal based on a progress of the execution of the program. The method can also include loading a next portion of the program stored in the first memory to the second memory and managing power supplied to the first memory based on the signal and an executing scheme stored in the second memory.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
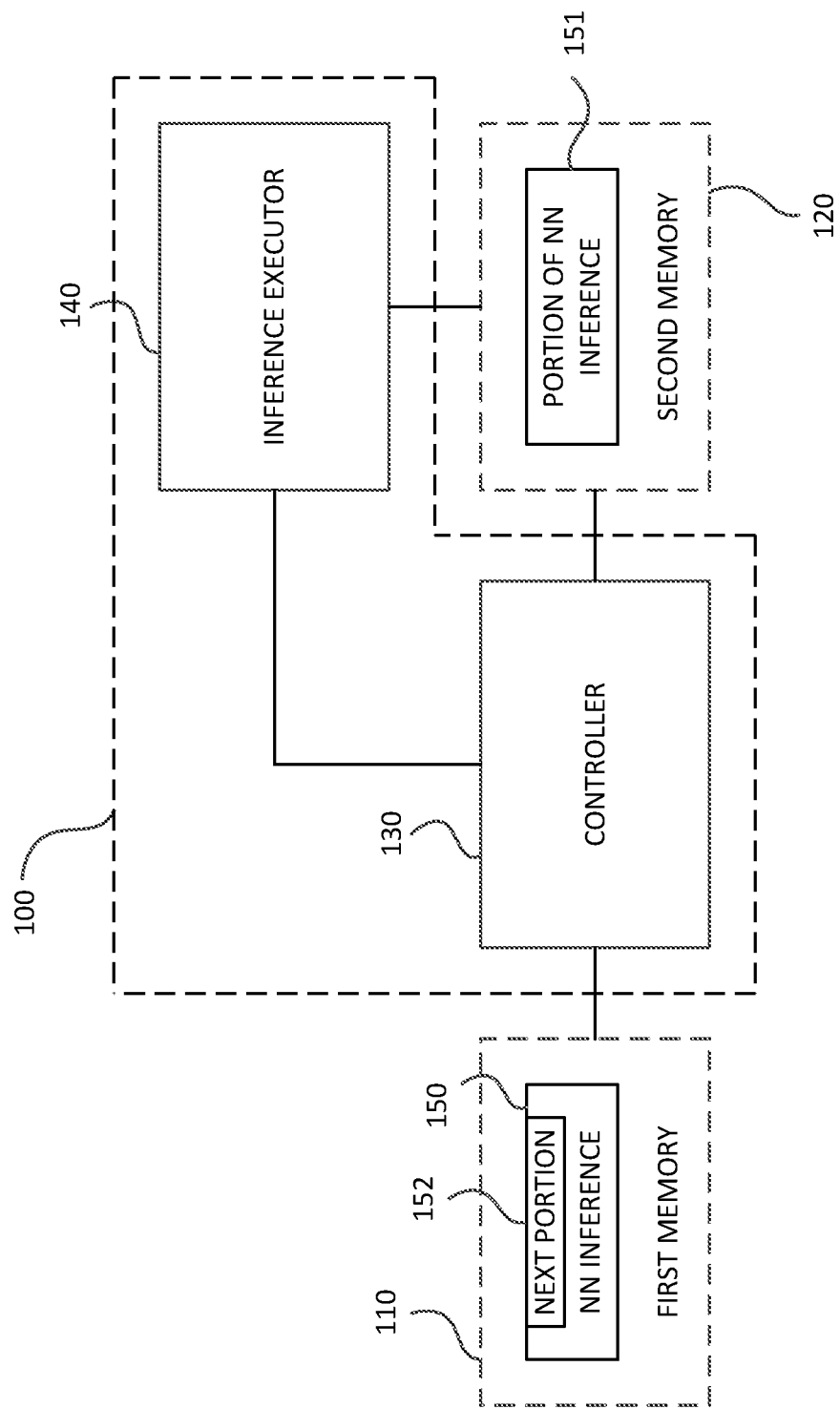
FIG. 1 shows a functional block diagram of an exemplary apparatus for executing a program, e.g., a neural network (NN) inference, according to some embodiments of the disclosure.

Neural networks (NNs) can be used to extract meaningful information or features out of a huge amount of data. Without being specifically programmed, the NNs can learn from various examples of a certain task during a process called training. After learning, the task can be performed on new data during a process called inference. During training, a best set of weights that optimize the accuracy of NN inference can be estimated. An NN inference, which is a type of programs, can include a huge amount of weights and activations, and, accordingly, be too large to be stored in, for example, a tightly-coupled memory (TCM), which can have a limited bandwidth. For example, the NN inference can be stored in a dynamic random access memory (DRAM), and the NN inference will be loaded from the DRAM to the TCM portion by portion for an inference executor to execute. During the loading and execution of the entire NN inference, the DRAM is always powered on, which can consume a great amount of power.

According to some aspects of the disclosure, a dynamic loading agent and an executing scheme, e.g., an inference executing scheme, can be introduced. In an embodiment, the inference executing scheme can be used to tell the dynamic loading agent about when and how to load a portion of the program, e.g., the NN inference, from the DRAM to the TCM and manage power supplied to the DRAM. For example, when the dynamic loading agent looks up the inference executing scheme and learns that a portion of the NN inference needs to be loaded from the DRAM to the TCM, the dynamic loading agent can turn on the DRAM, load the portion of the NN inference from the DRAM to the TCM, and turn off the DRAM after the portion of the NN inference is loaded to the TCM. According to some aspects of the disclosure, the DRAM will be powered off unless the dynamic loading agent for a great portion of the time when the NN inference is executed.

Smart devices, wearables, and other Internet of things (IoT) devices can include always-on continuous sensing apps and a variety of sensors, such as accelerometers, microphones, ambient light sensors, biometric sensors, etc., and use data gathered by these sensors to enable gesture or voice based control, monitor user activity and safety, and provide interpretation of a user's context. These IoT devices can perform analysis and interpretation of the gathered data on a main processor, and, accordingly, the main processor needs to be powered on frequently to address these continuous sensing tasks. These IoT devices may also utilize a dedicated low-power microprocessor, referred to as a sensor hub, to process the data, to offload the vast processing of the data from the main processor and reduce power consumption.

Tightly-coupled memories (TCMs) are one of a variety of on-chip memories that can be typically embedded in a low power processor to accelerate the data processing in the processor. TCMs are area expensive, so it is not cost-effective to embed a TCM of a large size in a processor. A TCM is implemented very close to a central processing unit (CPU) with access latency and size close to those of an L1 cache.

Neural networks (NNs), which are loosely modeled on the biology of human brain, can be used to extract meaningful information or features out of a huge amount of data. Without being specifically programmed, the NNs can learn from various examples of a certain task during a process called training. After learning, the task can be performed on new data during a process called inference. During training, a best set of weights that optimize the accuracy of NN inference can be estimated.

Artificial neural networks (ANNs) are one type of neural networks in deep learning (DNNs). An ANN can include multiple interconnected neurons (or nodes or units) arranged on various layers. Nodes from adjacent layers have connections or edges therebetween, and the connections have weights associated therewith. Each node can receive input(s) from some other nodes connected thereto at an adjacent layer, or outside world, and compute an output. Each input can have an associated weight, which is assigned based on its relative importance to other inputs. The node weighs the inputs with their associated weights, sums up the weighted inputs and a trainable constant value, referred to as a bias, and applies a non-linear activation function to the sum, so as to compute an output. The activation function can be a Sigmoid function, a hyperbolic tangent (tanh) function or a rectified linear unit (ReLU). The nodes of the ANN are categorized into input nodes, hidden nodes and output nodes, which are arranged in different layers (or called operations or operators) including an input layer, a hidden layer, and an output layer, respectively. The input nodes can receive data from the outside world, and pass on the data, without any computation, to the hidden nodes. The hidden nodes, as the name implies, have no direct connection with the outside world. The hidden nodes compute the data transferred from the input nodes, and transfer the computation results to the output nodes. The output nodes can transfer the computation results to the outside world.

Convolutional neural networks (CNNs) are one of the most popular NNs in deep leaning. Compared with an ANN, which treats input pixels of an image which are far apart and close together on exactly the same footing, and has its layers fully connected, a CNN takes into consideration the spatial structure of the image by using three basic ideas, including local receptive fields, shared weights, and pooling. Each neuron in the first hidden layer can be connected to a local receptive field of the input neurons corresponding to some input pixels of an image. The local receptive field can slide across the entire image by a certain stride length (e.g., one or two pixels) at a time, and build up the first hidden layer. The hidden neutrons in thus built first hidden layer can have the same weights and biases, and detect exactly the same feature just at different locations in the image. The map from the input layer to the hidden layer can be called a feature map. Weights and biases defining the feature map are called shared weighted and shared bias, respectively, which in turn define a kernel or filter. The shared weights and biases can greatly reduce the number of parameters involved in a convolutional network.

A CNN can be composed of a variety of different layers, including convolutional layers, pooling layers and fully-connected layers. Each of the layers can be defined by a weight matrix learned via a one-time training process that is executed before the CNN is ready for inference. Each of the convolutional layers can have kernels (or filters), and convolutes inputs with the kernels to get the outputs. For example, an operation (also called a layer or an operator), e.g., 2D convolution or addition, takes one or more input tensors and produces a single output. The pooling layers can be usually used immediately after the convolutional layers, and pool the convolutional layer to reduce the number of parameters of the input tensors. Each neuron in the pooling layer can summary a region of 2×2 neurons, for example, in the previous convolutional layer. For example, a pooling neutron can only output the maximum or average activation in the 2×2 input region. The final convolutional or pooling layers are flattened and output to the fully-connected layers, which form the last few layers in the CNN.

An NN inference may include a huge amount of weights and activations. As a model, e.g., the NN inference, becomes larger, it becomes more difficult for the entire NN inference to be deployed in the TCM. In practice, the NN inference may be stored in an external memory, e.g., a DRAM, and a portion of the NN inference will be moved to the TCM at a time for execution.

FIG. 1 shows a functional block of an exemplary apparatus 100 for executing a program, e.g., an NN inference, according to some embodiments of the disclosure. For example, the apparatus 100 can be a smartphone, a wearable, or any IoT device. In an embodiment, the apparatus 100 can include a controller 130 and an executor, e.g., an inference executor 140. For example, the inference executor 140 can be a central processing unit (CPU) or a microprocessor unit (MCU). The MCU is an attractive platform for building smartphones due to their low cost, wide availability, and modest power usage. In an embodiment, the controller 130 can be coupled between a first memory 110 and a second memory 120, and the inference executor 140 can be coupled to the second memory 120. For example, the first memory 110 can be a dynamic random access memory (DRAM), an on-bus static random access memory (SRAM), or a serial flash memory. As another example, the second memory 120 can be a cache, and the controller 130 can be a cache controller accordingly.

In an embodiment, an NN inference 150 can be stored in the DRAM 110. The cache controller 130 can load a portion 151 of the NN inference 150 stored in the DRAM 110 to the cache 120 at a time. The inference executor 140 can execute the portion 151 of the NN inference loaded on the cache 120. For example, when the cache 120 is hit, the inference executor 140 can execute the portion 151 of the NN inference 150 loaded on the cache 120. As another example, when the cache 120 is missed, which can indicate that the inference executor 140 is going to execute a next portion 152 of the NN inference 150, the cache controller 130 can then access the DRAM 110 and load the next portion 152 of the NN inference 150 stored in the DRAM 110 to the cache 120, and the inference executor 140 can then execute the next portion 152 of the NN inference 150 loaded on the cache 120.

Figure 2:
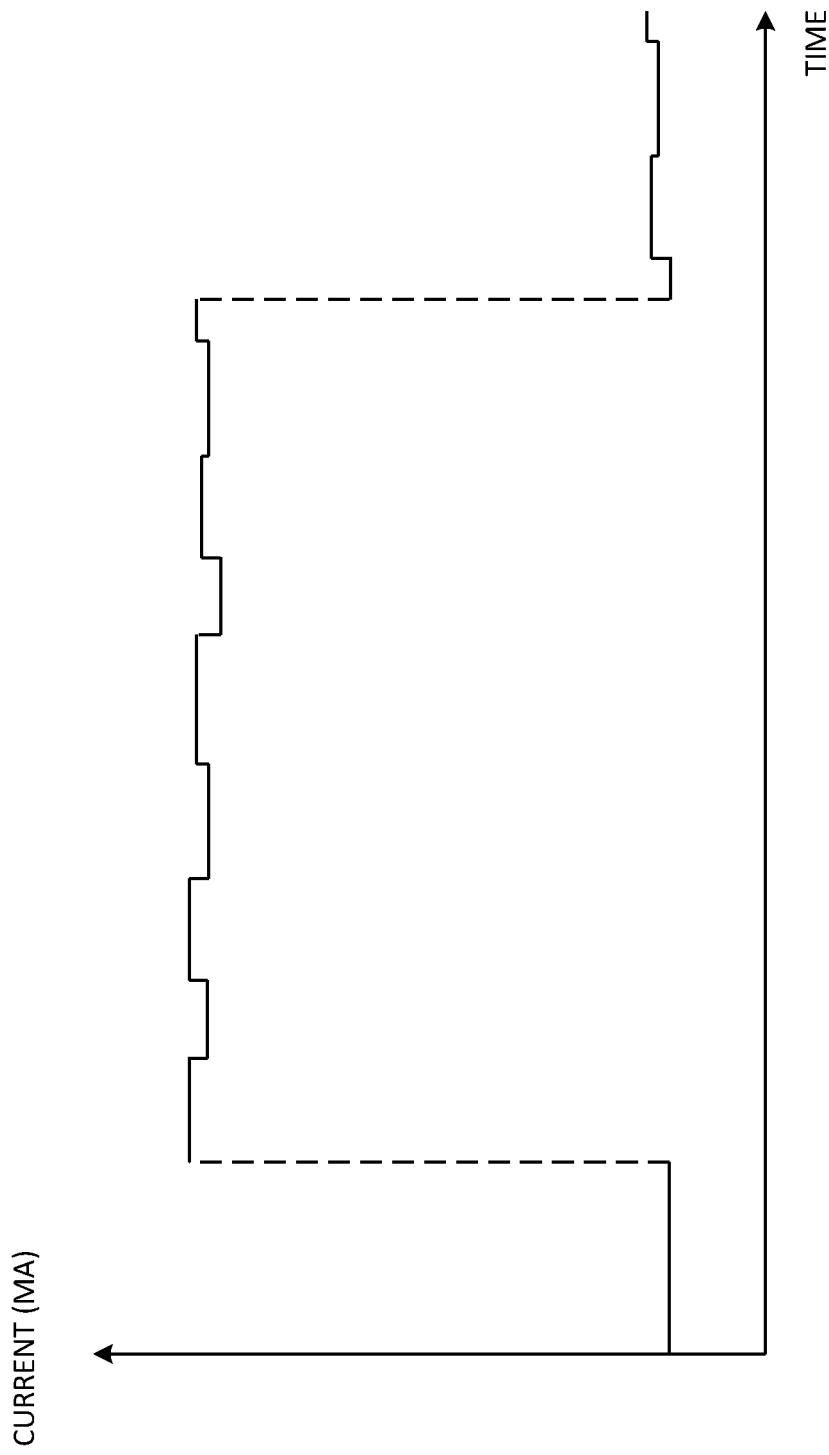
FIG. 2 shows a timing diagram of a current flowing through a first memory that stores the NN inference of FIG. 1 according to some embodiments of the disclosure.

FIG. 2 shows a timing diagram of a current flowing through the DRAM 110 of FIG. 1 during the execution of the entire NN inference 150 according to some embodiments of the disclosure. As shown in FIG. 2, when the cache 120 is missed, the cache controller 130 needs to access the DRAM 110. For example, the cache controller 130 can power on the DRAM 110, and then load the next portion 152 of the NN inference 150 to the cache 120. Once the DRAM 110 is powered on, it will not be powered off until the entire NN inference 150 is executed completely. Accordingly, the DRAM 110 can be always on during the loading and execution of the entire NN inference 150. FIG. 2 shows that the average current flowing through the DRAM 110 is approximately 24 mA.

Figure 3:
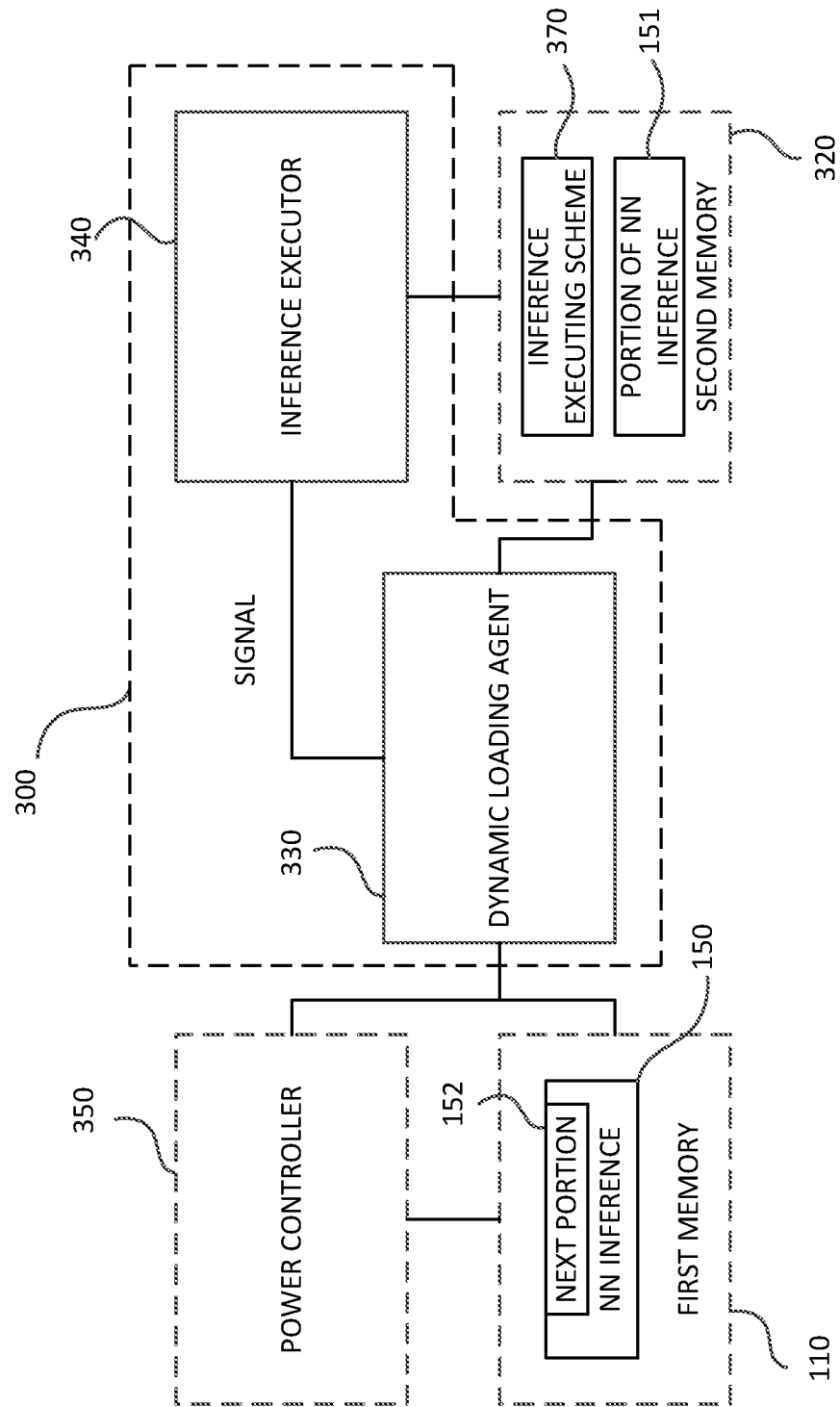
FIG. 3 shows a functional block diagram of another exemplary apparatus for executing an NN inference according to some embodiments of the disclosure.

FIG. 3 shows a functional block diagram of another apparatus 300 for executing an NN inference according to some embodiments of the disclosure. The apparatus 300 can also be a smartphone, a wearable, or any IoT device. The apparatus 300 can include a dynamic loading agent 330 and an inference executor 340 coupled to the dynamic loading agent 330. For example, the dynamic loading agent 330 and the inference executor 340 can be hardware or software. In an embodiment, the dynamic loading agent 330 and the inference executor 340 can be included on a single chip. In another embodiment, the dynamic loading agent 330 and the inference executor 340 can be two distinct chips. For example, the inference executor 340 can be a CPU, and the dynamic loading agent 330 can be an MCU. As another example, the inference executor 340 can be a deep learning accelerator (DLA), and the dynamic loading agent 330 can be an MCU. As yet another example, the inference executor 340 can be a CPU, and the dynamic loading agent 330 can be CPU exception. As still another example, the inference executor 340 can be a CPU that is set with an interrupt descriptor table, and the dynamic loading agent 330 can perform a specific exception handler function listed in the interrupt descriptor table when an exception occurs and the CPU interrupts its current works. In an embodiment, the inference executor 340 can be coupled to a second memory 320. For example, the second memory 320 can be a TCM or a static random access memory (SRAM). In another embodiment, the dynamic loading agent 330 can be coupled between the first memory 110 and the second memory 320. In yet another embodiment, the dynamic loading agent 330 can also be coupled to a power controller 350, and the power controller 350 can be coupled to the DRAM 110.

Figure 4:
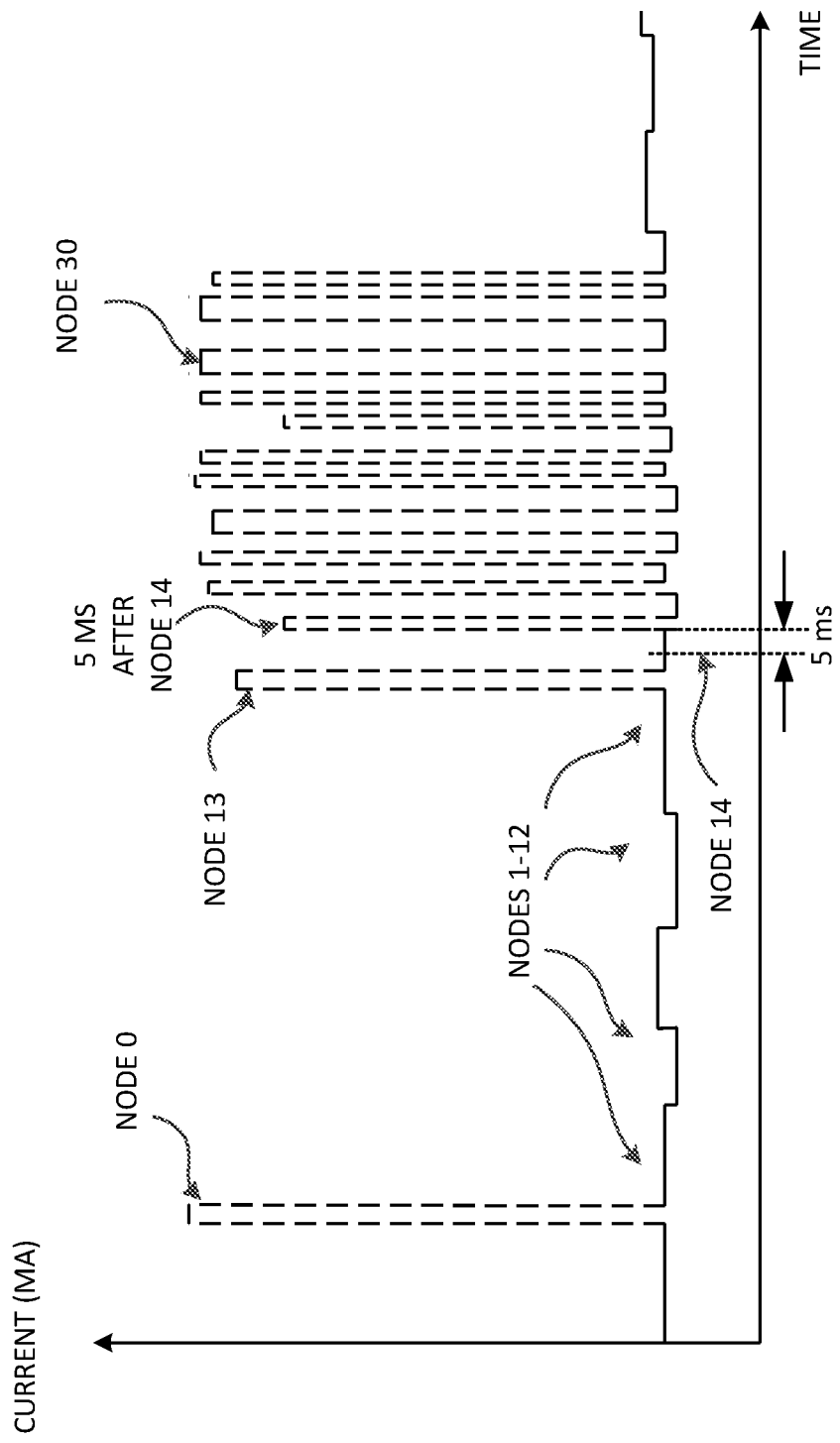
FIG. 4 shows a timing diagram of a current flowing through a first memory that stores the NN inference of FIG. 3 according to some embodiments of the disclosure.

The TCM 320 can be configured to store the portion 151 of the NN inference 150 loaded from the DRAM 110. The inference executor 340 can execute the portion 151 of the NN inference 150 loaded on the TCM 320, and generate a signal based on a progress of the execution of the NN inference 150. For example, the signal can include a node identification (ID) of the NN inference 150. In an embodiment, an inference executing scheme 370 can also be stored in the TCM 320. The dynamic loading agent 330 can load the next portion 152 of the NN inference 150 from the DRAM 110 to the TCM 320 and manage, via the power controller 350, power supplied to the DRAM 110 based on the signal and the inference executing scheme 370. For example, the dynamic loading agent 330 can manage the power supplied to the DRAM 110 by powering on/off the DRAM 110. In an embodiment, the dynamic loading agent 330 can be a script player, and the inference executing scheme 370 can be a script, which can recite the following contents:

Node 0: DRAM powered on
Node 0: data 0-12 loaded to TCM
Node 0: DRAM powered off
Node 13: DRAM powered on
Node 13: data 13 and 14 loaded to TCM
Node 13: DRAM powered off
5 ms after Node 14: DRAM powered on
Node 15: data 15 loaded to TCM
Node 15: DRAM powered off
Node 30: DRAM powered on
Node 30 & Convolution OP: do special op
Node 30: DRAM powered off FIG. 4 shows a timing diagram of a current flowing through the DRAM 110 of FIG. 3 during the execution of the entire NN inference 150 with the above script 370 stored in the TCM 320 according to some embodiments of the disclosure. Initially, the inference executor 340 needs a portion of an NN inference to execute, and generates a signal, e.g., Node 0. Upon receiving the signal of Node 0, the dynamic loading agent 330 can look up the script 370 stored in the TCM 320, and power on the DRAM 110 based on the script content "Node 0: DRAM powered on," load data 0-12 stored in the DRAM 110 to the TCM 320 based on the script content "Node 0: data 0-12 moved to TCM," and power off the DRAM 110 based on the script content "Node 0: DRAM powered off." Accordingly, the current flowing through the DRAM 110 can have a spike at node 0, as indicated by "NODE 0" in FIG. 4, since the DRAM 110 is powered on, and become very small after node 0, since the DRAM 110 is powered off. Then, the inference executor 340 can execute the portion 151 of the NN inference 150 loaded on the TCM, e.g., the data 0-12.

When executing the portion 151 of the NN inference 150 loaded on the TCM 320, the inference executor 340 can generate the signals of node 1 to node 12 sequentially based on a progress of the execution of the NN inference 150. As the script 370 does not recite any content indexed by node 1 to node 12, the dynamic loading agent 330 does nothing when receiving the signals of node 1 to node 12, and the DRAM 110 can be kept powered off, as indicated by "NODEs 1-12" in FIG. 4.

Then, the inference executor 340 can generate the signal of Node 13, as the inference executor 340 is executing at a node 13 and needs the next portion 152 of the NN inference 150 to execute, for example. Upon receiving the signal of Node 13, the dynamic loading agent 330 can look up the script 370, and power on the DRAM 110 based on the script content "Node 13: DRAM powered on," load data 13 and 14 stored in the DRAM 110 to the TCM 320 based on the script content "Node 13: data 13 and 14 moved to TCM," and power off the DRAM 110 based on the script content "Node 13: DRAM powered off" sequentially. Accordingly, the current flowing through the DRAM 110 can have a spike at node 13, as indicated by "NODE 13" in FIG. 4, since the DRAM 110 is powered on again, and become very small after node 13, since the DRAM 110 is powered off again. Then, the inference executor 340 can execute the next portion 152 of the NN inference 150 loaded on the TCM 320, e.g., the data 13 and 14.

Then, the inference executor 340 can generate the signal of Node 14, as the inference executor 340 is executing at a node 14 and needs another next portion of the NN inference 150 to execute, for example. Upon receiving the signal of Node 14, the dynamic loading agent 330 can look up the script 370, and power on the DRAM 110 5 ms after the reception of the signal of Node 14 based on the script content "5 ms after Node 14: DRAM powered on." Accordingly, the current flowing through the DRAM 110 can have a spike at a position 5 ms after node 14, as indicated by "5 ms after node 14" in FIG. 4.

Then, the inference executor 340 can generate the signal of Node 15, as the inference executor 340 is executing at a node 15 and needs yet another next portion of the NN inference 150 to execute, for example. Upon receiving the signal of Node 15, the dynamic loading agent 330 can look up the script 370, and load data 15 stored in the DRAM 110 to the TCM 320 based on the script content "Node 15: data 15 moved to TCM," and power off the DRAM 110 based on the script content "Node 15: DRAM powered off" sequentially. In this scenario, the DRAM 110 can be powered on already before the inference executor 340 generates the signal of Node 15, and the dynamic loading agent 330 can load the data 15 from the DRAM 110 to the TCM 320 right after the reception of the signal of Node 15. In an embodiment in which the dynamic loading agent 330 and the inference executor 340 are two distinct chips, the dynamic loading agent 330, after receiving the signal of Node 14, can power on the DRAM 110 while the inference executor 340 is executing at the node 15.

Then, the inference executor 340 can generate the signal of Node 30, as the inference executor 340 is executing at a node 30 and an operation associated with node 30 needs to be performed, for example. Upon receiving the signal of Node 30, the dynamic loading agent 330 can look up the script 370, and power on the DRAM 110 based on the script content "Node 30: DRAM powered on," pass setting or configurations to a convolution operator (e.g., indicated by a channel number, a data address, a buffer size etc.) and do some special operations (e.g., fine-grained operator, including loading small amount of data and executing fine-grained convolution operations) based on the script content "Node 30 & Convolution OP: do special op," and power off the DRAM 110 based on the script content "Node 30: DRAM powered off" sequentially.

Compared to the average current of 24 mA flowing through the DRAM 110 of FIG. 1, the average current flowing through the DRAM 110 of FIG. 3 is approximately 4.7 mA, as the DRAM 110 is powered off for a great portion of the time when the NN inference 150 is executed.

In an embodiment, the signal can further include time of the NN inference 150. For example, the signal of Node 14 can further include the time of 5 ms. In another embodiment, the signal can further include operations of the NN inference 150. For example, the signal of Node 30 can further include a convolution operation, which can include a convolution channel number. In yet another embodiment, the signal can further include tensors of the NN inference 150. For example, if there are some weighted data need to be processed, the signal can include a "tensor," and the dynamic loading agent 330 can, after receiving the tensor, perform the processing of the weighted data. In still another embodiment, the signal can further include kernels of the NN inference 150. For example, the signal can include a kernel and a tensor, and the dynamic loading agent 330 can, after receiving the kernel and the tensor, execute the tensor by using the kernel.

In an embodiment, the dynamic loading agent 330 can further manage the power supplied to the DRAM 110 by configuring an operation mode of the DRAM 110. For example, the dynamic loading agent 330 can configure the DRAM 110 to operate at a high-performance mode by scaling the data rate and row cycle time of the DRAM 110. In another embodiment, the dynamic loading agent 330 can further manage the power supplied to the DRAM 110 by dynamically scaling a voltage and/or a frequency applied to the DRAM 110 (DVFS), as the power consumption is proportional to $V^2$ xf. For example, the dynamic loading agent 330 can manage the power supplied to the DRAM 110 by reducing the voltage applied to the DRAM 110. Although reducing voltage may increase the propagation delay of signals, which can cause errors when using unmodified timing parameters, e.g., time required for the data to be reliably sensed and amplified in the row buffer, neutral networks are universal approximators and can still work very well if a system that is used to model the neutral networks has a high tolerance to errors.

Figure 5:
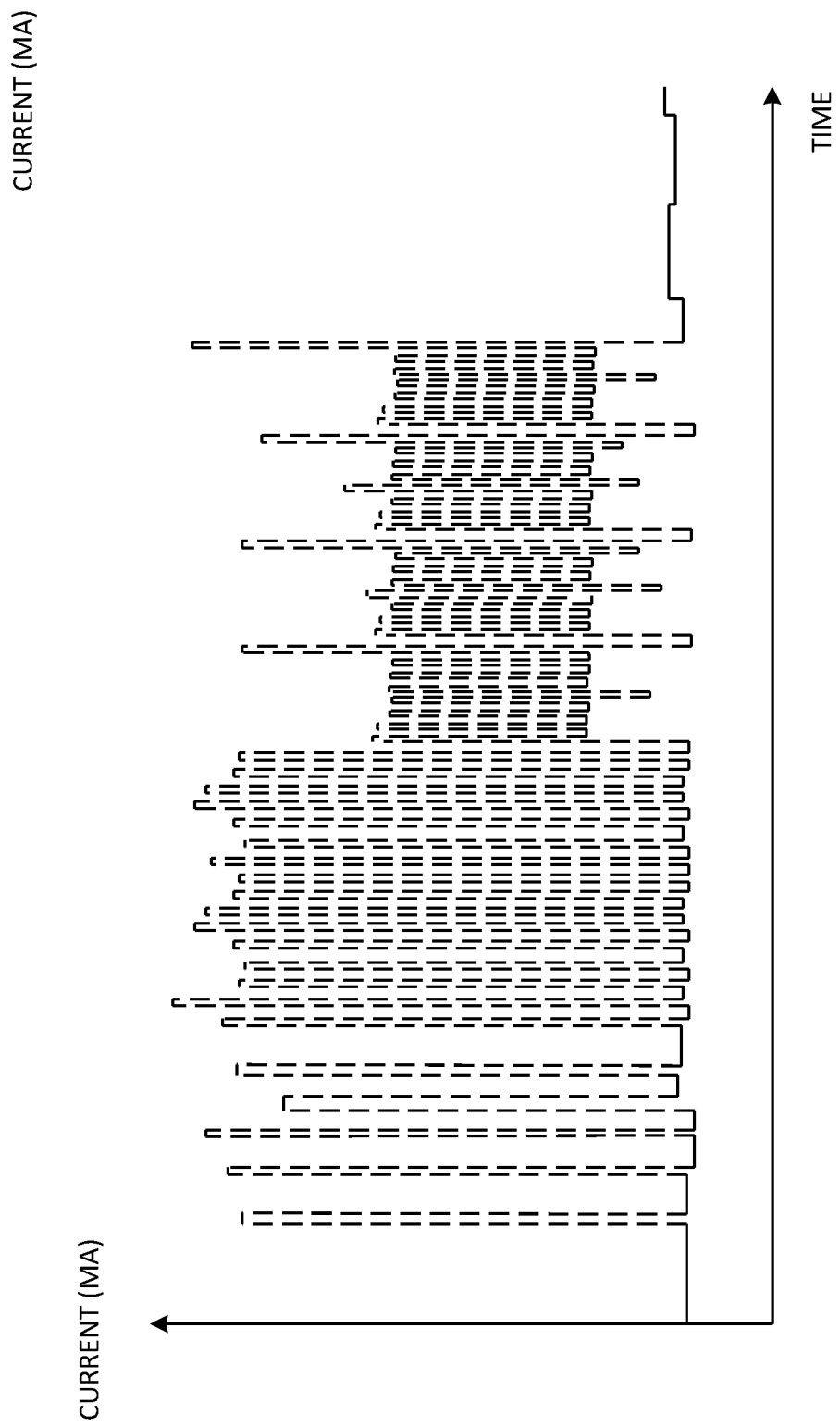
FIG. 5 shows a timing diagram of another current flowing through a first memory that stores the NN inference of FIG. 3 according to some embodiments of the disclosure.

In an embodiment, the inference executing scheme 370 can further include a rule. In an embodiment, the rule 370 can generate a script for a certain layer of the NN inference 150 based on the input tensors from a previous layer of the NN inference 150. For example, as shown in FIG. 5, which is a timing diagram of a current flowing through the DRAM 110 of FIG. 3 when the inference executing scheme 370 is a rule, the rule 370 can tell the dynamic loading agent 330 when (e.g., which layer or which node) and how to manage the power supplied to the DRAM 110 and load the data stored in the DRAM 110 to the TCM 320. As another example, the dynamic loading agent 330 can be a policy controller that is controlled by the rule 370. In another embodiment, the inference executing scheme 370 can further include a model. For example, the model 370 can be well trained to generate a rule or even a script for the dynamic loading agent 330 to look up. As another example, the dynamic loading agent 330 can be an NN executor of model for policy. In yet another embodiment, the inference executing scheme 370 can be man-made, such as the rule or script 370, or created by offline optimizers or online/runtime optimizers. Such optimizers can analyze a model and find out one of the best rules. For example, the online/runtime optimizers can create the rule 370 during runtime. As another example, the offline optimizers can create the rule 370 first, and the dynamic loading agent 330 can apply the rule 370 to know when and how to load a portion of the NN inference 150 from the DRAM 110 to the TCM 320 and manage power supplied to the DRAM 110.

Figure 6:
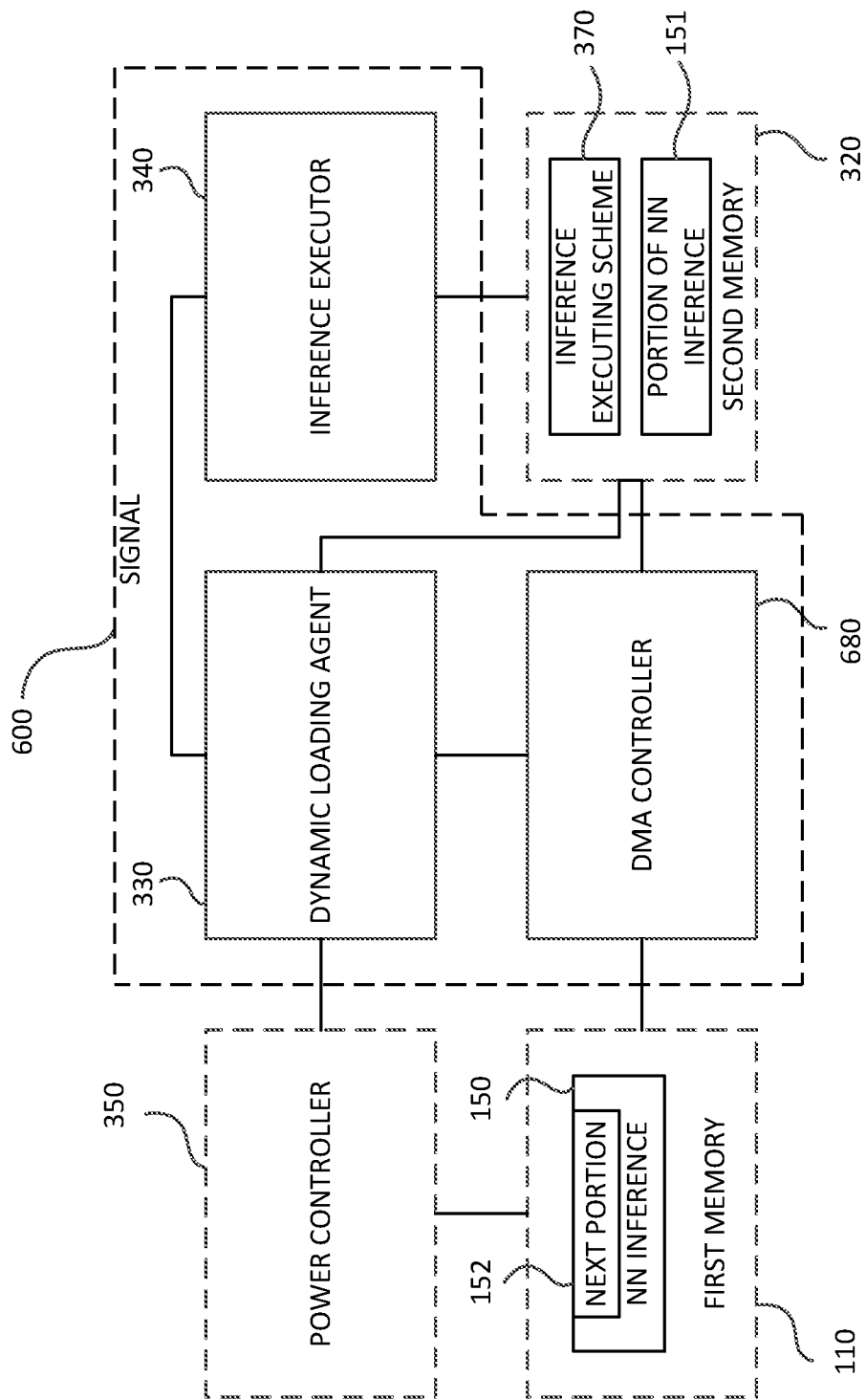
FIG. 6 shows a functional block diagram of yet another exemplary apparatus for executing an NN inference according to some embodiments of the disclosure.

FIG. 6 shows a functional block diagram of yet another exemplary apparatus 600 for executing an NN inference according to some embodiments of the disclosure. The apparatus 600 differs from the apparatus 300 of FIG. 3 in that the apparatus 600 can further include a direct memory access (DMA) controller 680 that is coupled among the DRAM 100, the TCM 320 and the dynamic loading agent 330. In an embodiment, the dynamic loading agent 330 can instruct the DMA controller 680 to load the portion 151 and the next portion 152 of the NN inference 150 directly to the TCM 320, without the involvement of the dynamic loading agent 330. For example, the dynamic loading agent 330, after receiving the signal from the inference executor 340, looking up the inference executing scheme 370 stored in the TCM 320 and learning that some data stored in the DRAM 110 need to be loaded to the TCM 320, can issue a command to the DMA controller 680 by sending some information to the DMA controller 680, including a read command, the number of words to be read, a starting location in the DRAM 110 to read from, and the address of the TCM 320, and the DMA controller 680 can then load the data from the DRAM 110 directly to the TCM 320 based on the information without going through the dynamic loading agent 330. After the loading is complete, the DMA controller 680 can send an interrupt signal to the dynamic loading agent 330 to inform that the DMA controller 680 has finished using the system bus. Compared with the apparatus 300, the apparatus 600 can have better speed performance. Accordingly, the DRAM 110 of FIG. 6 can consume less power than the DRAM 110 of FIG. 3 does.

Figure 7:
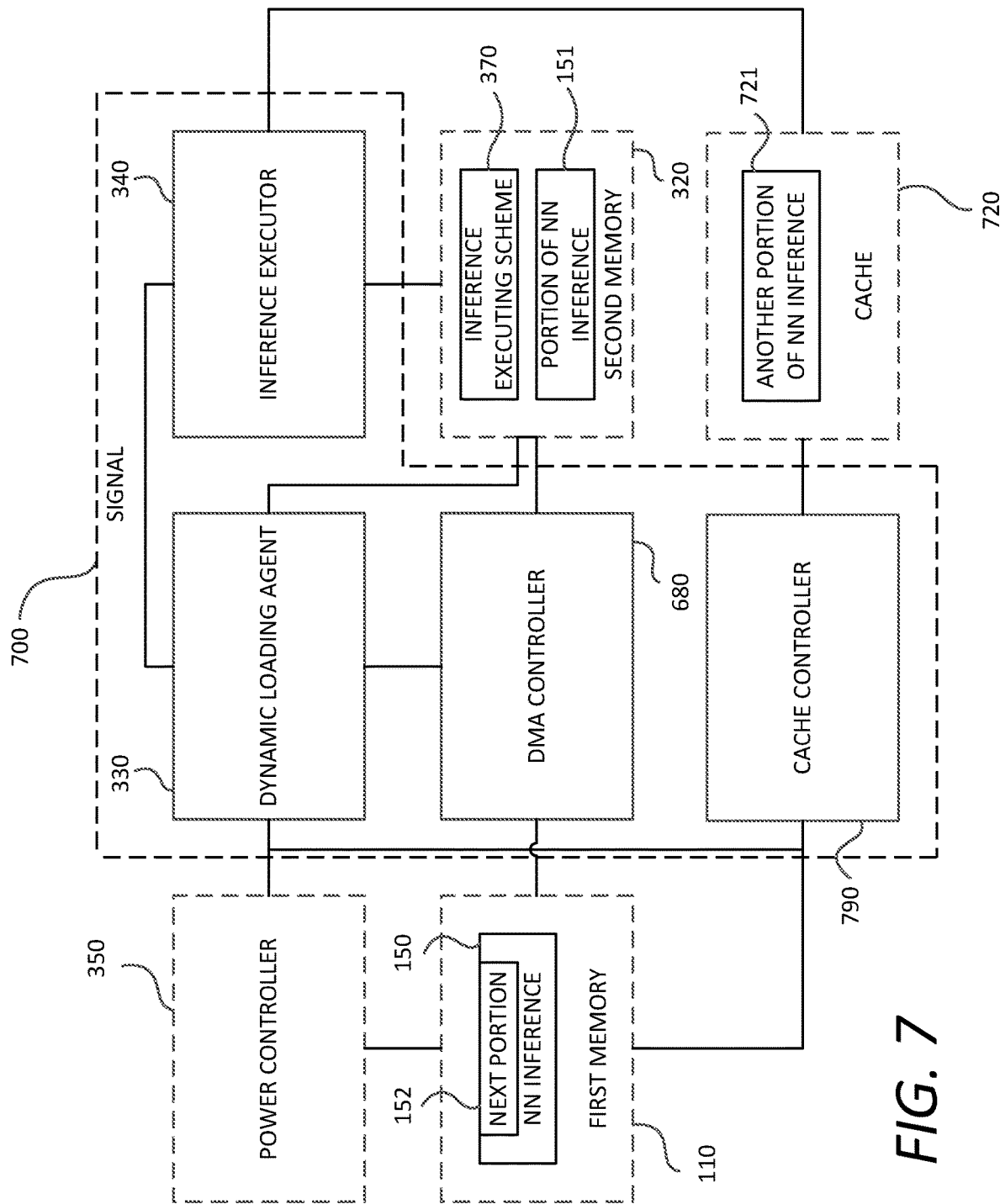
FIG. 7 shows a functional block diagram of still another exemplary apparatus for executing an NN inference according to some embodiments of the disclosure.

FIG. 7 shows a functional block diagram of yet another exemplary apparatus 700 for executing an NN inference according to some embodiments of the disclosure. The apparatus 700 differs from the apparatus 600 of FIG. 6 in that the apparatus 700 can further include a cache controller 790 that is coupled to the dynamic loading agent 330. In an embodiment, the cache controller 790 can be further coupled between the DRAM 100 and a cache 720. In another embodiment, the cache 720 can be further coupled to the inference executor 340. In yet another embodiment, the cache controller 790 can load another portion 721 of the NN inference 150 stored in the DRAM 110 to the cache 720, and the inference executor 340 can execute the another portion 721 of the NN inference 150 loaded from the DRAM 110 on the cache 720.

In an embodiment, the apparatuses 100, 300, 600 and 700 can further be configured to perform various functions in accordance with one or more embodiments or examples described herein. Thus, the apparatuses 100, 300, 600 and 700 can provide means for implementation of techniques, processes, functions, components, systems described herein. The 100, 300, 600 and 700 can be a general purpose computer in some embodiments, and can be a device including specially designed circuits to implement various functions, components, or processes described herein in other embodiments. The apparatuses 100, 300, 600 and 700 can optionally include other components, such as input and output devices, additional or signal processing circuitry, and the like. Accordingly, the apparatuses 100, 300, 600 and 700 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

Figure 8:
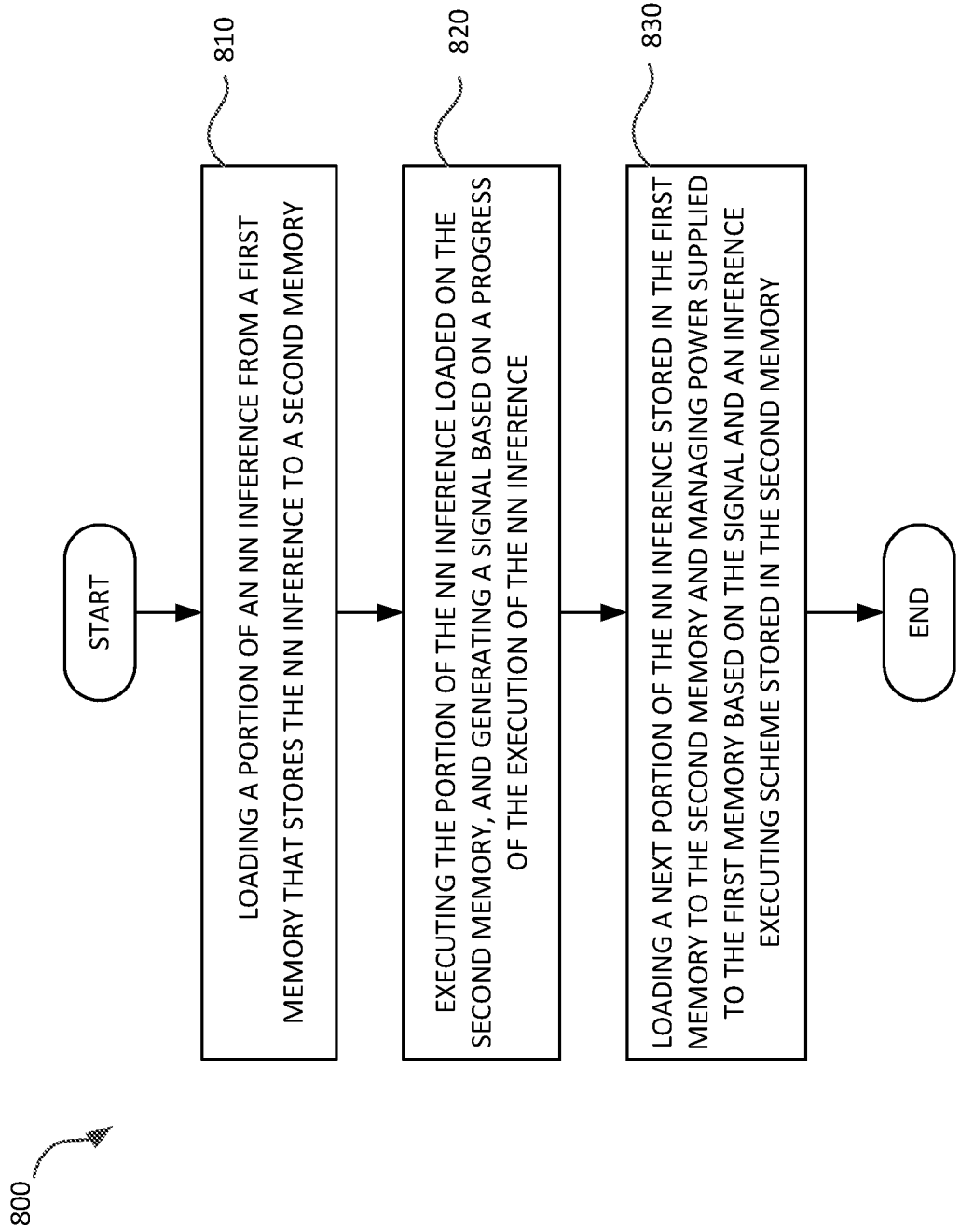
FIG. 8 shows a flowing chart of an exemplary method for executing an NN inference according to some embodiments of the disclosure.

FIG. 8 shows a flow chart of an exemplary method 800 for executing an NN inference according to some embodiments of the disclosure. Aspects of the method 800 can be performed at smartphones, wearables and other IoT devices, such as the apparatuses 100, 300, 600 and 700 illustrated in and describe with respect to the preceding figures. In various embodiments, some of the steps of the method 800 shown can be performed concurrently, in a different order than shown, can be substituted for by other method step, or can be omitted. Additional method steps can also be performed as desired. The method 800 can include steps 810, 820 and 830.

At step 810, a portion of an NN inference can be loaded from a first memory that stores the NN inference to a second memory. For example, the second memory can be a TCM or an SRAM. For another example, the first memory can be a DRAM, an on-bus SRAM, or a serial flash memory. In an embodiment, the portion 151 of the NN inference 150 can be loaded from the DRAM 110 to the TCM 320.

At step 820, the portion of the NN inference loaded on the second memory can be executed, and a signal can be generated based on a progress of the execution of the NN inference. In an embodiment, the portion 151 of the NN inference 150 loaded on the TCM 320 can be executed by the inference executor 340, and the signal, e.g., the signals of Node 13 and Node 30, can be generated by the inference executor 340 based on a progress of the execution of the NN inference 150.

At step 830, a next portion of the NN inference stored in the first memory can be loaded to the second memory and power supplied to the first memory can be managed based on the signal and an inference executing scheme stored in the second memory. For example, the power supplied to the first memory can be managed by powering on/off the first memory, configuring an operation mode of the first memory, or scaling a voltage and/or a frequency applied to the first memory. As another example, the inference executing scheme can be a script, a rule or a model. As yet another example, the signal can include an operation, a node ID, a tensor, a kernel and/or time of the NN inference. In an embodiment, the next portion 152 of the NN inference 150 stored in the DRAM 110 can be loaded to the TCM 320 and the power supplied to the DRAM 110 can be managed by powering on/off the DRAM 110 based on the script 370, e.g., DRAM powered on, DRAM powered off, data 0-12 moved to TCM and data 13 and 14 moved to TCM, and the signals, e.g., the signals of Node 0, Node 13, Node 14, Node 15, Node 30, 5 ms and convolution op. The method 800 can keep executing steps 820 and 830, till the complete of the execution of the entire NN inference 150.

Figure 9:
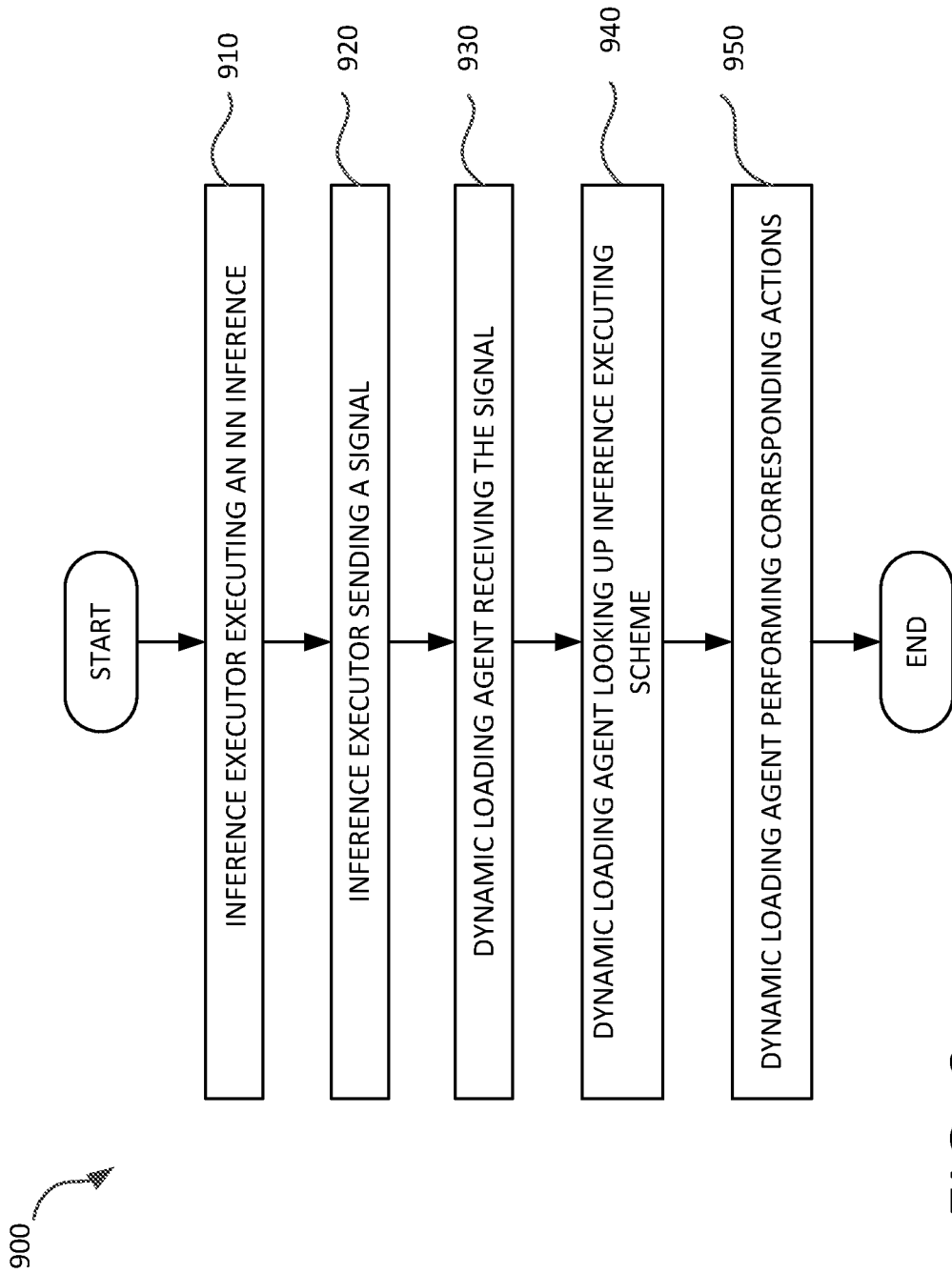
FIG. 9 shows a flowing chart of another exemplary method for executing an NN inference according to some embodiments of the disclosure.

FIG. 9 shows a flow chart of another exemplary method 900 for executing an NN inference according to some embodiments of the disclosure. Aspects of the method 900 can be performed at smartphones, wearables and other IoT devices, such as the apparatuses 100, 300, 600 and 700 illustrated in and describe with respect to the preceding figures. In various embodiments, some of the steps of the method 900 shown can be performed concurrently, in a different order than shown, can be substituted for by other method step, or can be omitted. Additional method steps can also be performed as desired. The method 900 can include steps 910, 920, 930, 940 and 950.

At step 910, an inference executor, e.g., the inference executor 340, can execute a portion of an NN inference that is loaded on a second memory, e.g., the portion 151 of the NN inference 150 loaded on the TCM 320. At step 920, the inference executor 340 can send a signal based on a progress of the execution of the NN inference 150, e.g., node ID, time, operation, tensor, kernel etc. At step 930, a dynamic loading agent, e.g., the dynamic loading agent 330, can receive the signal. At step 940, the dynamic loading agent 330, upon receiving the signal, can look up an inference executing scheme stored in the second memory 320 indexed by the signal, e.g., the inference executing scheme 370 stored in the TCM 320 index by node ID. At step 950, the dynamic loading agent 330 can perform corresponding actions based on the inference executing scheme 370 indexed by the signal, such as driving a DMA controller, e.g., the DMA controller 680, to load data, e.g., the next portion 152 of the NN inference 150, at specified time (preload) or to load multiple data (batch) from a first memory 110, e.g., the DRAM 110, to the TCM 320, enabling or disabling AP/DRAM/DMA power (schedule on/off), and/or passing configurations or settings to operator and do special operations (fine-grained operator). Steps 910, 920, 930, 940 and 950 of the method 900 can be kept executed, until the entire NN inference 150 has been loaded from the DRAM 100 to the TCM 320. In an embodiment, step 910 and steps 940 and 950 can be performed synchronously. For example, the dynamic loading agent 330 and the inference executor 340 can be included on a single chip, and the single chip can perform the steps 910, 940 and 950 sequentially. In another embodiments, step 910 and steps 940 and 950 can be performed asynchronously. For example, the dynamic loading agent 330 and the inference executor 340 can be two distinct chips, and the two distinct chips can perform step 910 and steps 940 and 950, respectively, in parallel.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An apparatus for executing a program, comprising:
   an executor that is configured to execute a portion of the program loaded on a second memory from a first memory that stores the program and to generate a signal based on a progress of the execution of the program; and
   a dynamic loading agent coupled to the executor, the first memory, and the second memory, the dynamic loading agent being configured to load a next portion of the program stored in the first memory to the second memory and to manage power supplied to the first memory based on the signal from the executor and an executing scheme stored in the second memory.

2. The apparatus of claim 1, wherein the dynamic loading agent manages the power supplied to the first memory by powering on/off the first memory, configuring an operation mode of the first memory, or scaling a voltage and/or a frequency applied to the first memory.

3. The apparatus of claim 1, wherein the executing scheme includes a script, a rule, or a model.

4. The apparatus of claim 3, wherein the rule generates a script for a certain layer of the program based on input tensors from a previous layer of the program.

5. The apparatus of claim 1, wherein the signal includes an operation, a node identification (ID), a tensor, a kernel, and/or time of the program.

6. The apparatus of claim 1, wherein the second memory is a tightly-coupled memory (TCM) or a static random access memory (SRAM).

7. The apparatus of claim 1, wherein the first memory is a dynamic random access memory (DRAM), an on-bus SRAM, or a serial flash memory.

8. The apparatus of claim 1, wherein:
   the executor is a central processing unit (CPU) and the dynamic loading agent is a microcontroller unit (MCU) or a CPU exception, or the executor is a deep learning accelerator (DLA) and the dynamic loading agent is an MCU.

9. The apparatus of claim 1, wherein the dynamic loading agent and the executor are included on a single chip.

10. The apparatus of claim 1, further comprising a direct memory access (DMA) controller coupled to the dynamic loading agent, the first memory, and the second memory, wherein the dynamic loading agent is further configured to instruct the DMA controller to load the next portion of the program stored in the first memory to the second memory.

11. The apparatus of claim 1, wherein the executing scheme is man-made or created by an offline optimizer or an online/runtime optimizer.

12. A method for executing a program, comprising:
  loading a portion of the program from a first memory that stores the program to a second memory;
  executing the portion of the program loaded on the second memory, and generating a signal based on a progress of the execution of the program; and
  loading a next portion of the program stored in the first memory to the second memory and managing power supplied to the first memory based on the signal and an executing scheme stored in the second memory.

13. The method of claim 12, wherein managing the power supplied to the first memory includes powering on/off the first memory, configuring an operation mode of the first memory, or scaling a voltage and/or a frequency applied to the first memory.

14. The method of claim 12, wherein the executing scheme includes a script, a rule, or a model.

15. The method of claim 14, wherein the rule generates a script for a certain layer of the program based on input tensors from a previous layer of the program.

16. The method of claim 12, wherein the signal includes an operation, a node ID, a tensor, a kernel and/or time of the program.

17. The method of claim 12, wherein the second memory is a TCM or an SRAM.

18. The method of claim 12, wherein the first memory is a DRAM, an on-bus SRAM, or a serial flash memory.

19. The method of claim 12, wherein the executing scheme is man-made or created by an offline optimizer or an online/runtime optimizer.

20. The method of claim 12, wherein executing the portion of the program and loading a next portion of the program stored in the first memory to the second memory and managing power supplied to the first memory are performed asynchronously.

21. The method of claim 12, wherein the second memory is more power efficient than the first memory.

22. The apparatus of claim 1, wherein the second memory is more power efficient than the first memory.

* * * * *